United States Patent [19]

Buch

[11] 4,358,632

[45] Nov. 9, 1982

[54] APPARATUS FOR SHIELDING HIGH FREQUENCY ELECTRICAL AND ELECTROMAGNETIC WAVES FOR TIGHT WALL LEAD-INS FOR GROUPS OF LINES

[76] Inventor: Jurgen Buch, Maschener Schutzenstrasse 45, Seevetal, Fed. Rep. of Germany

[21] Appl. No.: 130,237

[22] Filed: Mar. 14, 1980

[30] Foreign Application Priority Data

Mar. 14, 1979 [DE] Fed. Rep. of Germany ....... 2909890

[51] Int. Cl.³ ............................................. H02G 3/22
[52] U.S. Cl. ................................. 174/35 MS; 248/56
[58] Field of Search ................ 174/35 R, 35 MS, 151; 248/56; 361/424

[56] References Cited

U.S. PATENT DOCUMENTS

| | | | |
|---|---|---|---|
| 2,732,226 | 1/1956 | Brattberg | 248/56 X |
| 3,282,544 | 11/1966 | Brattberg | 248/56 |
| 3,489,440 | 1/1970 | Brattberg | 248/56 X |
| 3,830,954 | 8/1974 | Caudill | 174/35 MS |

Primary Examiner—B. A. Reynolds
Assistant Examiner—D. A. Tone
Attorney, Agent, or Firm—Andrus, Sceales, Starke & Sawall

[57] ABSTRACT

Apparatus for shielding high frequency electrical and electromagnetic waves for tight wall lead-ins for groups of lines. A pressure-resistant frame is filled by modular superimposed and juxtaposed partly or wholly elastic neutral pieces and fitting pieces. The number of the latter corresponds to that of the lines and is in each case in two parts. A circumferential slot extending to the metal shield of the line is made in the vicinity of the frame plane. The fitting pieces contain a web insertable in the slot. By deformation, the fitting pieces and neutral pieces are subsequently pressed against one another and against the frame in such a way that electrical conductive particles incorporated into the elastic material, which is swellable under heat action, are so displaced with respect to one another that fitting pieces and neutral pieces are made electrically conductive and water, gas and fire-proof over the entire cross-section thereof.

4 Claims, 5 Drawing Figures

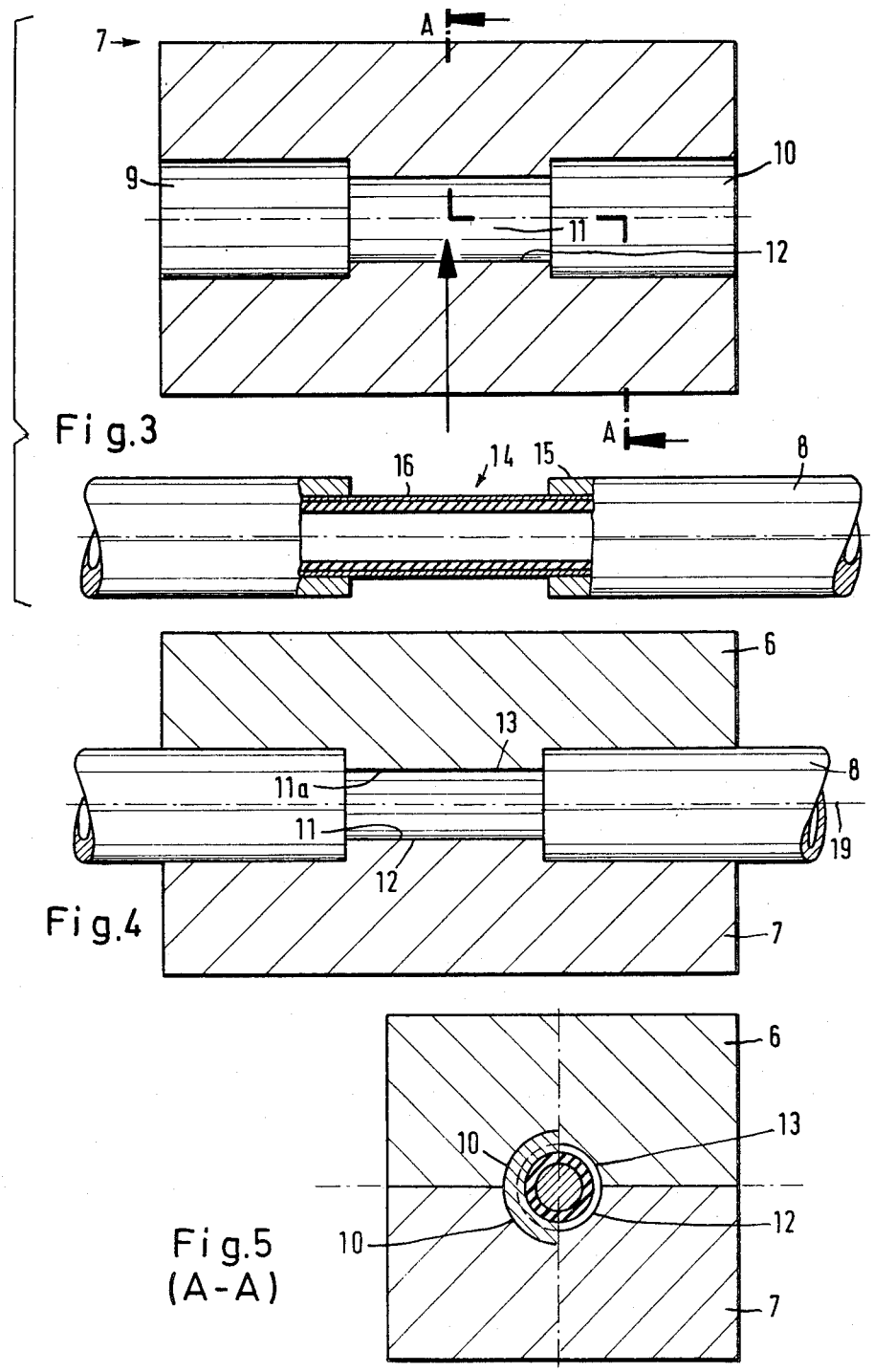

APPARATUS FOR SHIELDING HIGH FREQUENCY ELECTRICAL AND ELECTROMAGNETIC WAVES FOR TIGHT WALL LEAD-INS FOR GROUPS OF LINES

BACKGROUND OF THE INVENTION

The invention relates to an apparatus for shielding high frequency electrical and electromagnetic waves with respect to lines and groups of lines passed through a tight wall lead in. The invention comprises a pressure-resistant frame to be fixed to the wall entrance, the free space between the individual lines of the group and the frame being completely filled by modular, superimposed and juxtaposed, completely or partly elastic fitting pieces. A quantity thereof corresponding to the number of lines is in each case formed from two parts, provided with recesses emanating from their contact surfaces and adapted as regards shape and size to the cross-section of a particular line and, with the remaining fitting pieces, are under the action of a pressure acting in the frame plane, through which they are held in tight engagement with the lines and the frame inner wall.

If in known lead-ins of this type, the lines are to be shielded against high frequency electrical or electromagnetic waves in the vicinity of the lead-in, it is necessary to join the metal shield of the lines with a metal and preferably copper plate, which covers and is joined to the frame. This assembly procedure is expensive from the labor standpoint.

If the lines passed through the frame have to be supplemented or replaced, it is always necessary to break the connection between frame and metal plate and between metal plate and lines. After fitting the new lines, the appropriate metal plate must again be tightly connected with the line shields and with the lead-in frame.

BRIEF SUMMARY OF THE INVENTION

The problem of the invention is to provide an apparatus making it possible, even in the case of high pressures and fires and despite easy interchangeability of the lines, to ensure a completely satisfactory sealing with at the same time a complete shielding against high frequency electrical or electromagnetic waves, without special strong soldered joints being necessary.

According to the invention, this problem is solved in that circumferential slot extending to the metal shield is formed in the covering of the lines to be passed through the frame in the vicinity of the frame plane, each line is then placed in two fitting piece halves of a fitting piece and then the fitting pieces with the lines and optionally additional neutral or blank pieces are placed into the frame opening and fill the latter, after which the fitting pieces and the neutral pieces are pressed against one another and against the frame by deformation and wherein the electrically conductive particles incorporated into the elastic material of the fitting and neutral pieces which material is swellable under heat action are so displaced with respect to one another that the neutral and fitting pieces are electrically conductive, as well as water, gas and fire-proof over their entire cross-section.

BRIEF DESCRIPTION OF THE DRAWINGS

The invention is described in greater detail hereinafter relative to non-limitative embodiments and the attached drawings show:

FIG. 3 a fitting piece half of the apparatus of FIG. 1 with a line in a larger scale cross-sectional plan view.

FIG. 4 the fitting piece of FIG. 1 in an enlarged cross-sectional side view.

FIG. 5 the fitting piece of FIG. 4 in a front view in the cross-section A—A of FIG. 3.

DETAILED DESCRIPTION OF THE PREFERRED EMBODIMENTS

Figure 1:
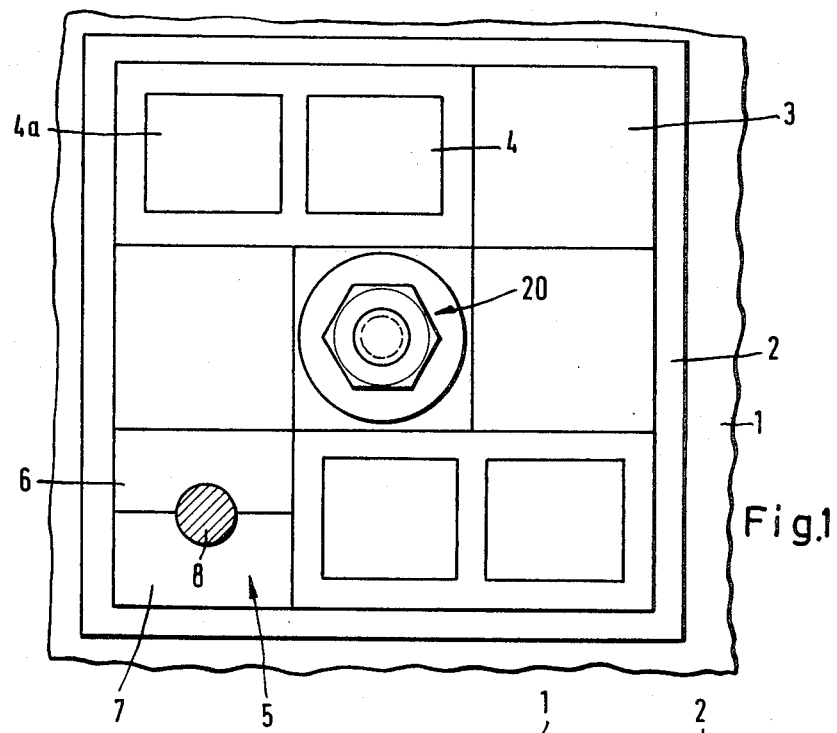
FIG. 1 a front view of the apparatus according to the invention.

FIG. 1 shows a frame 2 introduced into an opening in a wall 1. The frame contains modular neutral pieces 3, 4, a fitting piece 5 and a pressing means 20. The neutral pieces 4 are constructed as multi-chamber neutral pieces. They are twice as wide as a single neutral piece 3 and have in each case two recesses 4a, spaced from one another by a cross-member. The fitting piece 5 comprises two fitting piece halves 6, 7 which embrace a line 8.

As is shown in greater detail in FIGS. 3 to 5, each fitting piece 5 is constructed in such a way that it permits a direct mechanical contact with the shielding jacket 16 of a line 8. As the fitting pieces 5, like the shims of pressing member 20 and the neutral pieces 3, 4 are made from an elastic material, which is swellable under heat action in which electrically conductive metal particles are incorporated a continuous high frequency shield can be obtained by deforming the fitting pieces 5, pressing member 20 and neutral pieces 3, 4 with respect to one another and the inner wall of frame 2. It is essential that the material of fitting pieces 5, pressing member 20 and neutral pieces 3, 4 is only inadequately conductive in the non-deformed state, but on deformation acquires a conductivity extending over the cross-section involved, as a result of the displacement of the incorporated conductive metal particles. In addition to protecting the lead-in against fire, gas and water a high frequency shield is also obtained. Fitting pieces 5, the shims of pressing member 20, and neutral pieces 3, 4, may be formed from silicone rubber, neoprene rubber, or the like incorporating aluminum particles. The ability of these rubber materials to swell under heat action assists in maintaining the integrity of the seal in the event of a fire.

Each fitting piece 5 comprises two fitting piece halves 6, 7 in each of which is formed two semi-circular recesses 9, 10 coaxial to the central axis 19. The radii of recesses 9, 10 correspond to the external radius of the line 8 to be incorporated. An overhanging semi-circular web 12, 13 is formed between recesses 9, 10 in each fitting piece half 6, 7. The exposed surface 11, 11a of webs 12, 13 engages on the shielding jacket 16 of line 8 when fitting piece 5 is incorporated into the latter. To this end, the jacket of line 8 contains an circumferential slot 14 extending to the shielding jacket 16 and webs 12, 13 can be inserted in said slot. Preferably, recesses 9, 10 and exposed surface 11, 11a have the same length.

Figure 2:
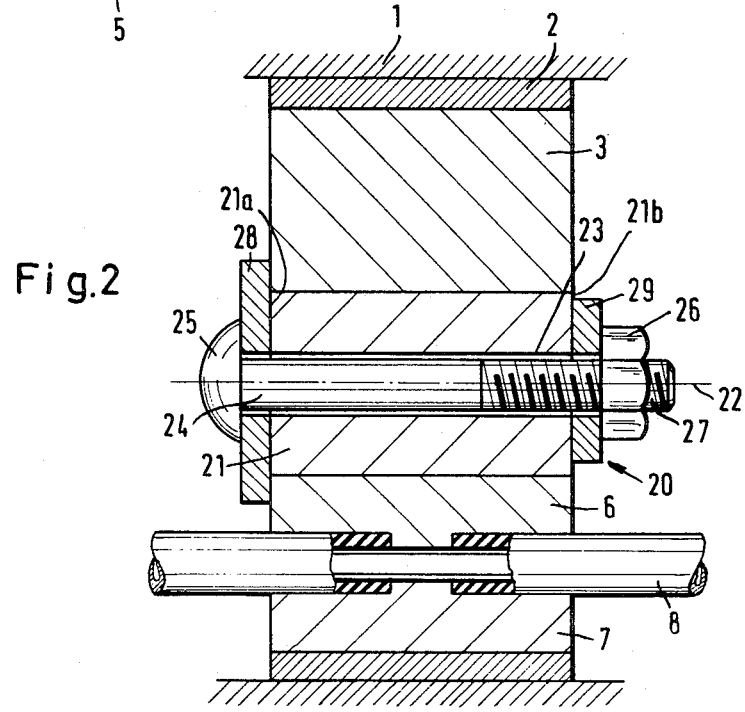
FIG. 2 a cross-sectional side view of the apparatus of FIG. 1.

The pressing member 20 is shown in FIG. 2 and comprises a parallelepipedic shim 21 corresponding to the modulus of fitting pieces 5 and is made from an elastic material, which swells under heat action into which are incorporated electrically conductive metal particles. An opening 23 is made coaxially to the central axis 22, through which is passed a bolt 24. A pressure plate 28 is arranged between the bolt head 25 and one end surface 21a of shim 21. Pressure plate 28 can be connected to head 25 by welding or the like. A pressure plate 29 is arranged between the nut 26 and the other end face 21b of shim 21. Pressure plate 28 preferably projects beyond the outer limiting surface of shim 21. For pressing the neutral pieces 3, fitting pieces 5 and multi-chamber neutral pieces 4 located in frame 2, pressing member 20 is introduced into the frame plane. By operating the nut 26, the pressure plates 28, 29 are then drawn onto one another, so that shim 21 is deformed and by the radial expansion of shim 21 the fitting pieces 5, neutral pieces 3 and multi-chamber neutral pieces 4 in the frame are pressed. This pressing is further aided through pressure plate 28 also engaging on the parts immediately adjacent to shim 21. Instead of deforming shim 21 by drawing the pressure plates 28, 29 onto one another, it is also possible to introduce frustum-shaped gripping members into opening 23 by means of the bolt and as a result shim 21 is pressed apart.

What is claimed is:

1. Apparatus for passing a plurality of conductors through a wall or the like in a water, gas, and fireproof manner while providing shielding against high frequency electrical and electromagnetic waves, said conductors having exposed shield jacket portions, said apparatus comprising:

a frame insertable in said wall for defining a passage therethrough;

a plurality of fitting pieces in the interior of said frame corresponding in number to the number of conductors;

a plurality of additional neutral pieces in said frame sufficient to fill same;

said fitting pieces and neutral pieces being formed of an at least partially elastic material swellable under heat action containing electrically conductive particles, each of said fitting pieces being formed as a pair of halves having recesses on their mating surfaces for receiving one of the conductors, each of said recesses having a projection for mating with the exposed shield jacket portion of the conductor within the frame, and an elastic material piece centrally positioned in said frame and having a hole receiving a bolt extending through said frame generally parallel to the axes of said recesses, said bolt mounting a pair of pressure plates applied to the faces of said centrally positioned piece and a nut for deforming said centrally positioned piece and exerting compressive forces on said fitting pieces and neutral pieces in said frame to obtain the sealing and shielding action.

2. The apparatus according to claim 1 wherein said recesses are semi-circularly formed and said projections are partially annular for mating with a circumferential exposed shield jacket portion of the conductor.

3. The apparatus according to claim 1 wherein said neutral pieces and fitting pieces are formed from material selected from the group consisting of silicone rubber and neoprene rubber in which aluminum particles are embedded.

4. The apparatus according to claim 1 wherein said neutral pieces are of different sizes.

* * * * *